(12) United States Patent
Carroll et al.

(10) Patent No.: US 9,464,948 B2
(45) Date of Patent: Oct. 11, 2016

(54) STRAIN GAUGE AND APPLICATIONS THEREOF

(71) Applicant: Wake Forest University, Winston-Salem, NC (US)

(72) Inventors: David Loren Carroll, Winston-Salem, NC (US); Tadhg O'Gara, Winston-Salem, NC (US); Thomas Smith, Winston-Salem, NC (US)

(73) Assignee: WAKE FOREST UNIVERSITY, Winston-Salem, NC (US)

( * ) Notice: Subject to any disclaimer, the term of this patent is extended or adjusted under 35 U.S.C. 154(b) by 0 days.

(21) Appl. No.: 14/382,169

(22) PCT Filed: Feb. 28, 2013

(86) PCT No.: PCT/US2013/028284
§ 371 (c)(1),
(2) Date: Aug. 29, 2014

(87) PCT Pub. No.: WO2013/130782
PCT Pub. Date: Sep. 6, 2013

(65) Prior Publication Data
US 2015/0101417 A1 Apr. 16, 2015

Related U.S. Application Data

(60) Provisional application No. 61/605,144, filed on Feb. 29, 2012, provisional application No. 61/646,528, filed on May 14, 2012.

(51) Int. Cl.
*G01B 7/16* (2006.01)
*G01L 1/00* (2006.01)
*G01L 1/22* (2006.01)
*B82Y 30/00* (2011.01)

(52) U.S. Cl.
CPC .............. *G01L 1/005* (2013.01); *G01L 1/22* (2013.01); *G01L 1/2287* (2013.01); *B82Y 30/00* (2013.01)

(58) Field of Classification Search
CPC ... G01N 27/3278; G01L 1/22; G01L 1/2287; B82Y 30/00
USPC .......................................... 73/760, 777, 774
See application file for complete search history.

(56) References Cited

U.S. PATENT DOCUMENTS

| | | | |
|---|---|---|---|
| 6,924,688 B1 * | 8/2005 | Beigel | G06K 19/0701 327/330 |
| 2010/0226100 A1 * | 9/2010 | Johnson | G06F 1/181 361/730 |

(Continued)

OTHER PUBLICATIONS

International Search Report and Written Opinion mailed Oct. 23, 2013 for PCT/US2013/028284, 13 pages.

(Continued)

*Primary Examiner* — Max Noori
(74) *Attorney, Agent, or Firm* — Smith Moore Leatherwood LLP; J. Clinton Wimbish (57) ABSTRACT

In one aspect, wireless strain gauges are described herein. In some embodiments, a wireless strain gauge comprises a radio frequency identification (RFID) tag and a nano-composite backplane coupled to the RFID tag, wherein the resonant frequency of the RFID tag antenna demonstrates an exponential dependence or substantially exponential dependence on the strain sensed by the strain gauge.

17 Claims, 2 Drawing Sheets

(56) References Cited

U.S. PATENT DOCUMENTS

| | | | |
|---|---|---|---|
| 2010/0271187 A1* | 10/2010 | Uysal | G06K 7/0008 340/10.4 |
| 2011/0058341 A1* | 3/2011 | Wu | H05K 7/1455 361/731 |
| 2013/0296747 A1* | 11/2013 | Perreault | A61H 31/005 601/41 |

OTHER PUBLICATIONS

Loh et al., Kenneth J., Passive Wireless Strain and pH Sensing Using Carbon Nanotube—Gold Nanocomposite Thin Films, Proceedings of SPIE, vol. 6529, Apr. 5, 2007, 12 pages.

Park et al., Myounggu, Strain-Dependent Electrical Resistance of Multi-Walled Carbon Nanotube/Polymer Composite Films, Nanotechnology, IOP Publishing Ltd., Bristol, GB, vol. 19, No. 5, Feb. 6, 2008, 7 pages.

* cited by examiner

STRAIN GAUGE AND APPLICATIONS THEREOF

RELATED APPLICATION DATA

The present application is a national stage application under 35 U.S.C. §371 of International Application No. PCT/US2013/028284, filed Feb. 28, 2013, which claims priority pursuant to 35 U.S.C. §119(e) to United States Provisional Patent Application Ser. No. 61/605,144 filed Feb. 29, 2012, and to United States Provisional Patent Application 61/646,528 filed May 14, 2012, each of which are incorporated herein by reference in their entireties.

FIELD

The present invention relates to strain gauges and, in particular, to strain gauges having wireless communication operability.

BACKGROUND

A number of strain gauge architectures have been developed for various applications. Conventional strain gauges are operable to undergo small mechanical deformation with an applied force, wherein the mechanical deformation results in a small change in gauge resistance proportional to the applied force. As a result, a strain gauge takes advantage of electrical conductance that is dependent not only on the electrical conductivity of the conductor, but the conductor's geometry as well.

In a conventional strain gauge construction, a continuous conductive strip of material or foil is arranged in alternating parallel lines or a grid pattern, such that stress in the direction of the orientation of the parallel lines results in a larger strain over the length of the conductor, thereby registering a larger change in resistance. The grid of parallel lines formed by the conductive strip is bonded to a thin backing, which is bonded directly to a test body. Strain experienced by the test body is transferred to the conductive grid, thereby permitting the strain gauge to respond with a change in electrical resistance. Conductive foil strain gauges require hard wiring for communication with processing systems operable to correlate changes in electrical resistance to applied strain. Such hard wiring can increase system complexity and power consumption making foil strain gauges unsuitable for several applications.

SUMMARY

Strain gauges are described herein which, in some embodiments, mitigate one or more disadvantages of prior strain gauges. In some embodiments, for example, strain gauges described herein demonstrate wireless communication operability without line of sight restrictions as well as low power consumption. A wireless strain gauge described herein comprises a radio frequency identification (RFID) tag and a nanocomposite backplane coupled to the RFID tag. In some embodiments, the resonant frequency of the RFID tag antenna demonstrates an exponential dependence or substantially exponential dependence on the strain sensed by the strain gauge.

In another aspect, apparatus for determining strain are described herein. An apparatus for determining strain comprises a wireless strain gauge comprising a RFID tag and a nanocomposite backplane coupled to the RFID tag and a tag reader. The apparatus, in some embodiments, further comprises at least one processor configured to receive data from the RFID tag reader. The processor, in some embodiments, is operable to assist in providing output information to a user of the apparatus regarding strain sensed by the wireless strain gauge. In some embodiments, for example, the output information provides an indication to the user whether the sensed strain is within a predetermined range. The output information, in some embodiments, is archived in an electronic memory or other data storage device.

In another aspect, methods of determining strain are described herein. In some embodiments, a method of determining strain comprises providing a wireless strain gauge comprising a RFID tag and a nanocomposite backplane coupled to the RFID tag, coupling the wireless strain gauge to a substrate and sensing strain associated with the substrate by determining the minimum activation power (MAP) of the RFID tag. The determined minimum activation power, in some embodiments, is correlated to a change in resonant frequency of the RFID antenna induced by the sensed strain. The change in resonant frequency of the RFID antenna, in some embodiments, demonstrates an exponential or substantially exponential dependence on the sensed strain. In some embodiments, the method further comprises transmitting data received from the strain gauge to at least one processor configured to receive the data. As described herein, the processor, in some embodiments, is operable to assist in providing output information to a user. Such output information, in some embodiments, is provided in real time. Moreover, the output information can be archived in an electronic memory or other storage device.

In another aspect, methods of increasing the sensitivity of wireless strain gauges are described herein. In some embodiments, a method of increasing the sensitivity of a wireless strain gauge comprises altering a change in resonant frequency of an RFID tag antenna of the strain gauge from a linear dependence on sensed strain to an exponential dependence on sensed strain, wherein altering comprises coupling a nanocomposite backplane to the RFID tag.

Strain gauges and methods of determining strain described herein can be applied to a variety of applications, including biological and/or anatomical applications. In some embodiments, for example, strain gauges having a construction and operating parameters described herein can be employed for determining strain and/or positioning of one or more moving parts of an animal or human body. In one aspect, apparatus for determining bodily position or posture are described herein. Such apparatus comprise at least one wireless strain gauge comprising a radio frequency identification (RFID) tag and a nanocomposite backplane coupled to the RFID tag and a tag reader, wherein the wireless strain gauge is calibrated to correlate a sensed strain induced by movement of the wearer with the bodily position or posture of the wearer. The apparatus further comprises at least one processor configured to receive data from the RFID tag reader. The processor can assist in providing output information regarding the posture of the wearer. In some embodiments, for example, the output information provides an indication to the wearer whether the posture is within a predetermined range. The output information can be output to the wearer in real-time and/or archived in an electronic memory or other data storage device.

In another aspect, methods of determining bodily position or posture are described herein. A method of determining posture comprises attaching at least one wireless strain gauge to a bodily location of a wearer, sensing a strain induced by movement of the wearer with the strain gauge and correlating the sensed strain with posture of the wearer, wherein the strain gauge comprises a RFID tag and a nanocomposite backplane coupled to the RFID tag. The method can further comprise transmitting data received from the strain gauge to at least one processor configured to receive the data. As described herein, the processor, in some embodiments, is operable to assist in providing output information to the wearer.

In a further aspect, methods of determining spinal position are described herein. A method of determining spinal position, in some embodiments, comprises attaching a plurality of wireless strain gauges along the spine of the wearer covering the cervical curvature, thoracic curvature and/or lumbar curvature, determining the existence of strain at each of the strain gauges induced by movement of the spine and correlating the sensed strain with the spinal position of wearer, wherein the wireless strain gauges comprise a RFID tag and a nanocomposite backplane coupled to the RFID tag.

DETAILED DESCRIPTION

Embodiments described herein can be understood more readily by reference to the following detailed description and drawings. Elements, apparatus, and methods described herein, however, are not limited to the specific embodiments presented in the detailed description, examples and drawings. It should be recognized that these embodiments are merely illustrative of the principles of the present invention. Numerous modifications and adaptations will be readily apparent to those of skill in the art without departing from the spirit and scope of the invention.

I. Strain Gauges

In one aspect, wireless strain gauges are described herein. In some embodiments, a wireless strain gauge comprises a RFID tag and a nanocomposite backplane coupled to the RFID tag. As described further herein, the resonant frequency of the RFID tag antenna demonstrates an exponential dependence or substantially exponential dependence on the strain sensed by the strain gauge.

Turning now to specific components, a wireless strain gauge described herein comprises a RFID tag. Any RFID tag not inconsistent with the objectives of the present invention can be used in the wireless strain gauge. In some embodiments, a suitable RFID tag has an operating frequency permitting communication with the tag reader over a distance of 1-2 meters or greater. In some embodiments, a RFID tag has an operating frequency suitable for backscatter coupling with a tag reader. Operating frequency of the RFID tag of the strain gauge can be in the Ultra High Frequency (UHF) band of the radio spectrum. For example, a RFID tag of a wireless strain gauge described herein can have an operating frequency ranging from about 800 MHz to about 1000 MHz. In some embodiments, a RFID tag has an operating frequency from 902 MHz to 928 MHz or from 865 MHz to 867 MHz. Alternatively, the operating frequency of an RFID tag can be in the Super High Frequency (SHF) band of the radio spectrum. A RFID tag, in some embodiments, has an operating frequency ranging from about 2.4 GHz to about 6 GHz.

In some embodiments, a RFID tag of a strain gauge described herein has an operating frequency permitting communication with the tag reader over a distance of 1 meter or less. In one embodiment, an RFID tag has an operating frequency suitable for communication with the tag reader over a distance of 100 cm or less. Further, a RFID tag can have an operating frequency suitable for inductive coupling with the tag reader. In some embodiments, for example, a RFID tag has an operating frequency in the Low Frequency (LF) band or High Frequency (HF) band of the radio spectrum.

Wireless strain gauges described herein, in some embodiments, employ passive RFID tags. In having a passive classification, the RFID tag is powered for communication activities/exchanges by gathering RF energy transmitted from the tag reader by backscatter coupling (UHF) or inductive coupling (LF and HF). Alternatively, in some embodiments, the RFID tag of a wireless strain gauge is an active RFID tag being powered by an internal power source.

RFID tags of strain gauges described herein can have sufficiently small footprints enabling placement on a variety of substrates. In some embodiments, the footprint of the RFID tag does not interfere with or alter other components of the substrate. In some embodiments, for example, the RFID tag has a footprint less than 3 cm in diameter or length.

A wireless strain gauge also comprises a nanocomposite backplane coupled to the RFID tag. A nanocomposite backplane, in some embodiments, comprises a layer of dielectric material having nanoparticles disposed therein. In some embodiments, a suitable dielectric material has a dielectric constant ranging from greater than about 1 to about 10. In some embodiments, a dielectric material of the nanocomposite backplane has a dielectric constant greater than about 10. In some embodiments, the dielectric material is not an electrolyte or polyelectrolyte.

A dielectric material of the nanocomposite backplane serving as a host for the nanoparticles can comprise a polymeric material. In some embodiments, a dielectric polymeric material is not anionic, polyanionic, cationic or polycationic. A dielectric material, for example, can comprise one or more fluorinated polymers such as polyvinylidene fluoride (PVDF), poly(vinyl fluoride) (PVF), polytetrafluoroethylene (PTFE), perfluoropropylene, polychlorotrifluoroethylene (PCTFE) or copolymers and combinations thereof. In some embodiments, a dielectric material comprises one or more elastomers. Elastomers include silicone rubbers, such as polydimethylsiloxane (PDMS) and cross-linked PDMS. Elastomers can also be formed by polymerization of butadiene monomers, such as 1,3-butadiene. Butadiene monomers, for example, can be polymerized alone or in combination with other monomeric species including styrene and/or acrylonitrile. Further, a dielectric material can comprise polyacrylates including polyacrylic acid (PAA), poly (methacrylate) (PMA), poly(methylmethacrylate) (PMMA) or copolymers and combinations thereof. In some embodiments, a dielectric material comprises polyethylenes, polypropylenes, polystyrenes, poly(vinylchloride), polycarbonates, polyamides, polyimides or copolymers and combinations thereof. Polymeric dielectric materials, according to embodiments, contemplate any suitable molecular weight ($M_w$) and polydispersity as understood by one of skill in the art.

A dielectric material can also comprise ceramic particles disposed in a binder. In some embodiments, for example, a dielectric material comprises inorganic oxide, nitride or carbide particles in an organic binder, such as a polymeric binder. Inorganic particles can comprise transition metal oxides, nitride and/or carbides. Inorganic dielectric particles can have sizes in the range of 1 µm to 1 mm.

Nanoparticles disposed in the dielectric layer forming the nanocomposite backplane can comprise inorganic nanoparticles, organic nanoparticles or mixtures thereof. Inorganic nanoparticles can comprise metal nanoparticles, including transition metal nanoparticles. In some embodiments, metal nanoparticles comprise nanowires. For example, nanoparticles of the dielectric layer can comprise silver, copper or gold nanowires. Organic nanoparticles suitable for the dielectric layer of the nanocomposite backplane can comprise carbon nanoparticles including fullerenes, fullerene derivatives, graphene, graphene derivatives or carbon nanotubes or mixtures thereof. In some embodiments, carbon nanotubes comprise single-walled carbon nanotubes (SWNT), multi-walled carbon nanotubes (MWNT) or mixtures thereof.

Carbon nanotubes can be undoped or doped with boron, nitrogen or combinations thereof. In some embodiments, for example, doped carbon nanotubes comprise boron in an amount ranging from about 0.01 weight percent to about 10 weight percent and/or nitrogen in an amount ranging from about 0.01 weight percent to about weight 30 percent. In some embodiments, doped carbon nanotubes comprise nitrogen in an amount greater than about 30 weight percent.

Nanoparticles of the composite backplane can have an aspect ratio greater than 1. In some embodiments, the nanoparticles have an aspect ratio ranging from about 1.1 to about 10,000 or from about 10 to about 1,000. Additionally, nanoparticles of the composite backplane are spherical or elliptical in shape.

The dielectric layer of the nanocomposite backplane can comprise any nanoparticle loading operable to register a strain-induced change in the relative dielectric ($\in_r$) of the backplane of sufficient magnitude to establish an exponential relationship between the RFID antenna resonant frequency and strain applied to the backplane. In some embodiments, nanoparticles are present in the dielectric layer in an amount at or approaching the percolation threshold. Nanoparticles, in some embodiments, are present in the dielectric layer in an amount ranging from about 0.05 weight percent to about 5 weight percent. In some embodiments, nanoparticles are present in an amount ranging from about 0.05 weight percent to about 2 weight percent or from about 0.1 weight percent to about 1 weight percent. Additionally, the nanoparticles can be dispersed throughout the dielectric material. Dispersion of nanoparticles throughout the dielectric material can be uniform or substantially uniform.

The dielectric layer comprising nanoparticles positioned therein can be provided as a singular monolithic layer or as an assembly of sublayers. Sublayers of a dielectric layer can have substantially the same constructions or divergent constructions. In some embodiments, for example, the nanoparticle loadings of sublayers can be varied to establish a nanoparticle gradient in the dielectric layer of the composite backplane. Further, different dielectric materials can be used among the sublayers establishing one or more dielectric compositional gradients.

The dielectric layer of the nanocomposite backplane can have any thickness not inconsistent with the objectives of the present invention. In some embodiments, for example, the dielectric layer has a thickness in the range of 1 nm to 200 µm. The dielectric layer can have thickness in the range of 10 nm to 150 µm or 20 nm to 100 µm. In some embodiments, the dielectric layer has a thickness in the range of 0.5 µm to 100 µm.

Figure 1:
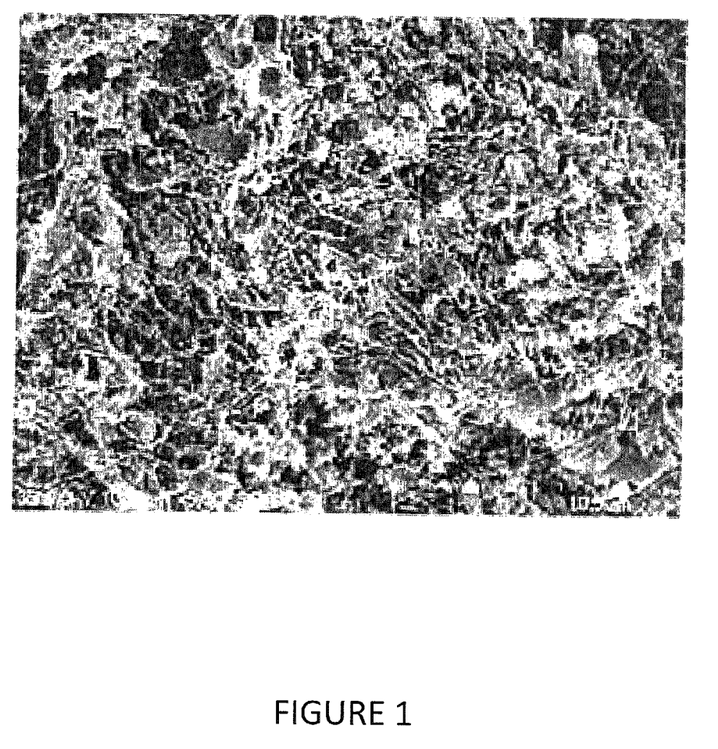
FIG. 1 illustrates a nanocomposite of a RFID backplane according to one embodiment described herein.

FIG. 1 provides a microscopy image of a nanocomposite backplane according to one embodiment described herein.

In some embodiments, the nanocomposite backplane is coupled directly to a surface of the RIFD tag. For example, the nanocomposite backplane can be fabricated directly on a surface of the RFID tag. Alternatively, in some embodiments, one or more coupling layers are disposed between the nanocomposite backplane and RIFD tag.

The resonant frequency ($f_r$) for the antenna of the RFID tag coupled with the nanocomposite backplane is determined according to Equation (1):

$$f_r = c/[4(L+\Delta L)(\in_r)^{0.5}] \qquad (1)$$

where c is the speed of light, L is the length of the nanocomposite backplane and $\Delta L$ is the change in the length of the backplane in response to an applied strain and $\in_r$ is the relative dielectric of the nanocomposite backplane to which the antenna couples. Small or slight deformation(s) of the nanocomposite backplane ($\Delta L$) in response to substrate strain can produce large changes in $\in_r$ of the nanocomposite backplane. Strain induced changes to $\in_r$ of the nanocomposite backplane, in some embodiments, are an order of magnitude or greater. Strain induced changes to $\in_r$ of the nanocomposite backplane can be at least several orders of magnitude. Strain providing such changes to $\in_r$ of the nanocomposite backplane, in some embodiments, equates to a $\Delta L/L$ of the nanocomposite backplane of less than or equal to about 0.05. In some embodiments, strain providing order of magnitude changes to $\in_r$ of the nanocomposite backplane equates to a $\Delta L/L$ of less than or equal to about 0.005 or less than or equal to about 0.001. Strain inducing order of magnitude changes to $\in_r$ of the nanocomposite backplane, in some embodiments, equates to a $\Delta L/L$ ranging from about 0.0001 to about 0.1 or from about 0.0005 to about 0.05.

The antenna of the RFID tag displays a change in resonant frequency in response to the applied or sensed strain. Prior RFID sensors have demonstrated a substantially linear change in resonant frequency ($f_r$) according to Equation (2):

$$f'_r = c/[4(1+\in)(L+\Delta L))(\in_r)^{0.5}] = f_r/(1+\in) \approx f_r(1-\in) \qquad (2)$$

where $\in = \Delta L/L$. However, it has been found that the change in resonant frequency ($f'_r$) of the antenna of the RFID tag in conjunction with the nanocomposite backplane is more accurately modeled according to Equation (3):

$$f'_r = f_r(1-\in)e^{-\alpha(\in)} \qquad (3)$$

where $\in = \Delta L/L$. As a result, the change in resonant frequency of the RFID antenna of a wireless strain gauge described herein demonstrates an exponential dependence on the applied or sensed strain as opposed to the former linear response of Equation (2). This exponential relationship greatly enhances the sensitivity of the wireless strain gauges described herein, thereby allowing the gauges to detect and respond to slight or negligible strains induced by small substrate deformation(s) previously undetectable by prior linear response strain gauges.

Moreover, changes in the resonant frequency of the RFID antenna resulting from strain induced in the nanocomposite backplane in response to substrate deformation can also result in changes in the minimum activation power of the RFID tag for response to reader interrogation. The power received by the RFID antenna from the tag reader can be approximated using the Friis free space expression that involves several geometrical factors as set forth in Banalis, C. A., *Antenna Theory: Analysis and Design*, John Wiley and Sons, Inc., New York 1997. Accordingly, the power received by the antenna of the RFID tag is approximated by Equation (4):

$$P_{antenna} = P_{reader} C(f)^{-2} \quad (4)$$

where f=reader frequency and C is a combination of geometrical factors and gain. The power received from the reader is transferred through the antenna to the integrated circuit (IC) of the RFID tag. This power transfer is maximized when the impedance of the antenna is matched with the impedance of the IC. However, in wireless strain gauges described herein, the nanocomposite backplane coupled to the RFID tag yields an impedance mismatch between the antenna and IC of the tag. This impedance mismatch produces a reflected RF signal, rejected by the internal IC and fed back into the antenna. The reflection coefficient can be estimated by Equation (5):

$$\eta(f) = [(Z_{Load} - Z_{Antenna}^*)/(Z_{Load} - Z_{Antenna})]^2 \quad (5)$$

where $Z_{Load}$ is the impedance of the IC and * represents the imaginary component of antenna impedance. When the interrogation frequency of is equal to the resonant frequency of the antenna, $\eta(f)$ reaches a minimum. The power reflected by the IC of the tag, therefore, is provided by Equation (6):

$$P_{reader} = P_{antenna}[1 - \eta(f)] \quad (6)$$

In embodiments of wireless strain gauges described herein incorporating passive RFID tags, there exists a minimum operating power to activate the tag that is transmitted to the IC. For a given interrogation frequency, the minimum activation power of the passive RFID tag of the wireless strain gauge is defined as the minimum transmitted power ($P_{IC}$) by the antenna required to activate the tag. Maximum power transfer from the antenna to the IC occurs when the impedance of the antenna is matched to the impedance of the IC and when the interrogation frequency is matched to the resonant frequency of the antenna. As described herein, the resonant frequency of the antenna can change significantly in response to a sensed or applied strain to the nanocomposite backplane (see Eq. 3 herein). Therefore, the minimum activation power transmitted by the reader, $P_{reader}$, required for a response from the RFID tag is given according to Equation (7):

$$P_{reader}(f) = [Cf^2/(1 - \eta(f)] \cdot P_{IC} \quad (7)$$

where C is geometrical constant and $\eta$ is an exponential function of $\in = \Delta L/L$.

In view of this relationship, the minimum activation power of the RFID tag is associated with the resonant frequency of the RFID antenna which is correlated to the degree of strain experienced by the nanocomposite backplane. Further, the strain experienced by the nanocomposite backplane is correlated to the strain experienced by the substrate to which the nanocomposite backplane is coupled. Therefore, quantifying the minimum activation power of the RFID tag permits a determination of strain experienced by the substrate to which the RFID strain gauge is attached.

In some embodiments, the minimum activation power of the RFID tag and/or the associated strain sensed by the nanocomposite backplane can be correlated with strain of the substrate through use of one or more calibration charts. In some embodiments, for example, a calibration chart comprises one or more reference RFID tag minimum activation power values associated with a strain value of the substrate. A calibration chart, in some embodiments, is constructed by assigning reference RFID tag minimum activation power values to strain values experienced by the substrate. Assignation of RFID tag minimum activation power values to substrate strain values can be accomplished experimentally/empirically or theoretically. In some embodiments, for example, a RFID strain gauge described herein is coupled to a substrate. A series of know strain values are induced on the substrate and the minimum activation power value for each strain value is determined for the RFID strain gauge to provide the reference minimum activation power values.

Alternatively, in some embodiments, a master reference minimum activation power value is assigned to the RFID strain gauge, this master value corresponding to the substrate free of applied strain. Deviation from the master reference minimum activation power value of the RFID strain gauge indicates the substrate is under an applied load. In some embodiments, the degree of substrate strain is proportional to the amount by which the minimum activation power value of the RFID strain gauge deviates from the master reference minimum activation power value.

In some embodiments, reference minimum activation power values, including a master reference value, can vary depending of proximity of the reader to the RFID strain gauge. A calibration chart, therefore, can be constructed to account for such proximity variances. Further, reference minimum activation power values, including a master reference value, will vary according to substrate identity. It is contemplated that calibration charts for a variety of substrates can be constructed permitting wide application of wireless RFID strain gauges described herein. Substrates can comprise mechanical components of various structures and/or apparatus experiencing strain, such as building structures, bridges and other infrastructure, airplane or vehicle components and cable assemblies. In some embodiments, for example, the wireless RFID strain gauges are suitable for use in a variety of health and usage monitoring systems (HUMS) as well as biological applications described further herein. In some embodiments, calibration charts are provided in electronic format for access by a processor of an apparatus incorporating the wireless strain gauge.

With a calibration chart for a substrate established, the RFID tag of the wireless strain gauge can be interrogated by a reader and the minimum activation power of the tag determined. The determined minimum activation power is subsequently compared with the calibration chart and the reference minimum activation power value matching or substantially matching the determined minimum activation power is selected. The substrate strain value assigned to the selected reference minimum activation power value quantifies the substrate strain. The RFID tag of the wireless strain gauge can be routinely interrogated by the reader for continuous or periodic monitoring of substrate strain.

Figure 2:
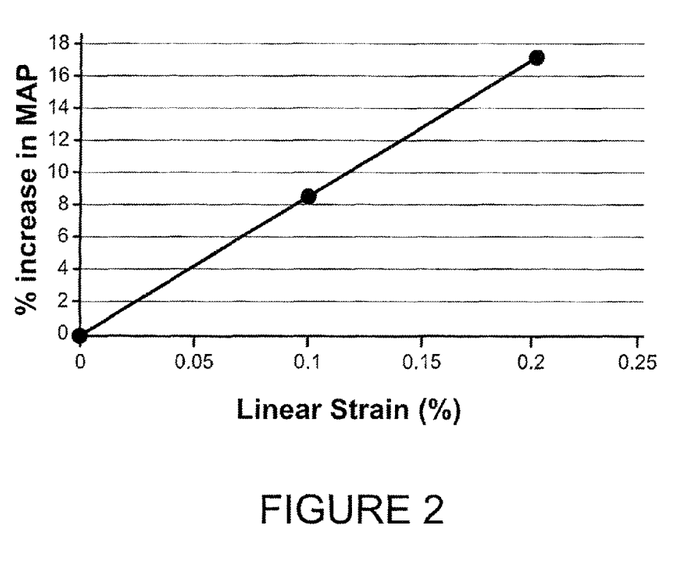
FIG. 2 illustrates change in minimum activation power of an RFID tag in response to strain applied to a nanocomposite backplane coupled to the tag according to one embodiment described herein.

Further, the determined minimum activation power can derive a strain value for the strain sensed at the nanocomposite backplane with reference to the change in resonant frequency of the RFID antenna, as set forth in the equations hereinabove. FIG. 2 illustrates change in minimum activation power of an RFID tag in response to strain sensed or applied to the nanocomposite backplane according to one embodiment described herein.

As with minimum activation power, the derived strain value can be correlated with strain of the substrate. Correlation of the derived strain value of the nanocomposite backing with strain of the substrate, in some embodiments, is administered with a calibration chart in a manner similar to that described for the minimum activation power. In some embodiments, for example, a calibration chart comprises reference strain values, which are assigned substrate strain values. Assignation of substrate strain values to reference strain values can be accomplished empirically/experimentally or theoretically. In some embodiments, for example, a RFID strain gauge described herein is coupled to a substrate. A series of known strain values are induced on the substrate and the derived strain value for the nanocomposite backplane for each induced strain value is determined to provide the reference strain values.

With a calibration chart for a substrate established, the RFID tag of the wireless strain gauge can be interrogated by a reader and the derived strain value of the tag determined. The derived strain value is subsequently compared with the calibration chart, and the reference strain value matching or substantially matching the derived strain value is selected. The substrate strain value assigned to the selected reference strain value quantifies the substrate strain. The RFID tag of the wireless strain gauge can be routinely interrogated by the reader for continuous or periodic monitoring of substrate strain.

As described herein, apparatus for determining strain comprising a wireless strain gauge comprising a RFID tag and a nanocomposite backplane coupled to the RFID tag and a tag reader can further employ at least one processor configured to receive data from the RFID tag reader. In some embodiments, for example, the processor receives data from the tag reader regarding the minimum activation power of one or more RFID tags on the substrate of interest and operates on the received data to provide an output related strain applied to or experienced by the substrate. The processor operates on the received data in conjunction with a calibration chart to select a strain value for the substrate determined by the minimum activation power and/or derived strain of one or more wireless strain gauges on the substrate. In such embodiments, the calibration chart is provided in electronic format for access by the processor.

Moreover, in some embodiments, the processor assists in transmitting information to a user detailing substrate strain. For example, the processor can transmit information regarding substrate strain to a display device and/or audio device for communication to a user. In some embodiments, the display and/or audio device provides an alert or indication to the user when strain experienced by the substrate falls outside a predetermined range. Alternatively, the display and/or audio device, in some embodiments, provides an indication to a user when strain experienced by the substrate is within a predetermined range. In some embodiments, the processor is separate from the display and/or audio device. Alternatively, the processor can be part of the display and/or audio device.

The processor may also be operable to assist in storage of data received from the tag reader. In such embodiments, the processor can assists in storing the received data in a long term electronic storage device or a short term electronic storage device. In some embodiments, for example, the processor assists in storing the received data for archival purposes.

Additionally, an apparatus for determining strain described herein can further include a clock and/or global positioning system (GPS). The clock and/or GPS can be used in conjunction with substrate strain information provided by the processor and wireless strain gauge(s) to correlate substrate strain with specific times and/or locations. Such information can be used to identify times and/or locations where the substrate experiences undesirable strains. In some embodiments, the clock and/or GPS is part of the display and/or audio device.

II. Methods of Determining Strain

In another aspect, methods of determining strain are described herein. A method of determining strain comprises providing a wireless strain gauge comprising a RFID tag and a nanocomposite backplane coupled to the RFID tag, coupling the wireless strain gauge to a substrate and sensing strain associated with the substrate by determining the minimum activation power of the RFID tag. The determined minimum activation power, in some embodiments, is correlated to a change in resonant frequency of the RFID antenna induced by the sensed strain.

Turning now to specific steps, methods of determining strain described herein comprise coupling at least one wireless strain gauge to a substrate. In some embodiments, a plurality of wireless strain gauges is coupled to a substrate. The nanocomposite backplane of a wireless strain gauge, in some embodiments, is placed directly on the substrate surface. Alternatively, an adhesive can be used to attach the wireless strain gauge to the substrate surface.

With one or more wireless strain gauges described herein attached to the substrate surface, a strain applied to the substrate is sensed with the strain gauge(s). Sensing strain associated with the substrate, in some embodiments, is administered by determining the minimum activation power of the RFID tag as described herein. The RFID tag of a wireless strain gauge, in some embodiments, is periodically or continuously interrogated by the reader to determine minimum activation power values. As described herein, the determined minimum activation power of the RFID tag can be correlated to the strain experienced by or applied to the substrate through a calibration chart. For example, in some embodiments, the determined minimum activation power of the RFID tag is compared with a calibration chart comprising one or more reference RFID tag minimum activation power values. The reference RFID tag minimum power activation value matching or substantially matching the determined minimum activation power is selected and the associated substrate strain determined.

Further, in some embodiments, the determined minimum activation power derives a strain value for the nanocomposite backplane coupled to the RFID tag. In such embodiments, correlating this derived strain value with substrate strain comprises comparing the derived strain value with a calibration chart comprising one or more reference strain values and selecting the reference strain value matching or substantially matching the derived strain value. The substrate strain value assigned to the selected reference strain value quantifies the substrate strain.

Methods described herein can further comprise providing output information to a user regarding strain applied to or experienced by the substrate. In some embodiments, such output information is provided in real time. Output information can be provided with a display and/or audio device as described herein. Moreover, output information can be archived in an electronic memory or other storage device.

In another aspect, methods of increasing the sensitivity of wireless strain gauges are described herein. In some embodiments, a method of increasing the sensitivity of a wireless strain gauge comprises altering a change in resonant frequency of an RFID tag antenna of the strain gauge from a linear dependence on sensed strain to an exponential dependence or substantially exponential dependence on sensed strain, wherein altering comprises coupling a nanocomposite backplane to the RFID tag. RFID tags and nanocomposite backplanes for increasing the sensitivity of wireless strain gauges can have any construction and/or properties described in Section I hereinabove.

III. Anatomical Applications of Wireless Strain Gauges

Strain gauges and methods of determining strain described according to Section I herein can be applied to a variety of applications, including biological and/or anatomical applications. In some embodiments, for example, strain gauges having a construction and operating parameters described herein can be employed for determining strain and/or positioning of one or more moving parts of an animal or human body.

In one aspect, for example, apparatus for determining bodily position or posture are provided herein. Such apparatus comprise at least one wireless strain gauge comprising a radio frequency identification (RFID) tag and a nanocomposite backplane coupled to the RFID tag and a tag reader, wherein the wireless strain gauge is calibrated to correlate a sensed strain induced by movement of the wearer with the bodily position or posture of the wearer. The apparatus further comprises at least one processor configured to receive data from the RFID tag reader. The processor can assist in providing output information regarding the posture of the wearer. In some embodiments, for example, the output information provides an indication to the wearer whether the posture is within a predetermined range. The output information can be output to the wearer in real-time and/or archived in an electronic memory or other data storage device.

Wireless strain gauges comprising an RFID tag and nanocomposite backplane for use in apparatus of determining bodily position and/or posture can have any construction and properties described in Section I herein. As set forth in the relationships detailed in Section I above, the minimum activation power of the RFID tag is associated with the resonant frequency of the RFID antenna, which is correlated to the degree of strain experienced by the nanocomposite backplane. Therefore, quantifying the minimum activation power of the RIFD tag permits a determination of strain experienced by the nanocomposite backplane.

The minimum activation power of the RFID tag and/or the associated strain sensed by the nanocomposite backplane can be correlated with a bodily position or posture of an individual. Correlation of the minimum activation power and/or sensed strain with a specific bodily position or posture of an individual, in some embodiments, is administered with a calibration chart. In some embodiments, for example, a calibration chart comprises one or more reference RFID tag minimum power activation values associated with bodily position(s) or posture. A calibration chart, in some embodiments, is constructed by choosing a master reference minimum power activation value associated with a specific bodily position or posture. Reference minimum power activation values deviating from this master reference value indicate a different bodily position or posture has been assumed by the wearer. In some embodiments, reference minimum power activation values deviating from the master reference value are each assigned a specific bodily position or posture. Assignation of bodily position or posture to a reference minimum power activation value can be accomplished empirically/experimentally or theoretically.

In some embodiments, reference minimum power activation values, including the master reference value, can vary depending on proximity of the reader to the wireless strain gauges. The calibration chart, therefore, can be constructed to account for such proximity variances.

With the calibration chart established, the RFID tag of the wireless strain gauge can be interrogated by a reader and the minimum activation power of the tag determined. The determined minimum activation power is subsequently compared with the reference minimum activation power values of the calibration chart and the bodily position or posture matching or substantially matching the determined minimum activation power is selected. The RFID tag of the wireless strain gauge can be routinely interrogated by the reader for continuous or periodic monitoring of body position or posture of the wearer. In some embodiments, multiple wireless strain gauges are used in conjunction for determining bodily position of posture. For example, individual strain gauges applied to the body of an individual can be treated as sampling points for use of the Nyquist sampling theorem in modeling or reconstructing bodily positioning or posture. Increasing the number of wireless strain gauges is equivalent to increasing the sampling frequency according to the Nyquist sampling theorem.

As an example, in some embodiments, a wireless strain gauge of an apparatus described herein is topically attached to a wearer along the lumbar curvature of the spine. A master reference minimum activation power value is assigned to a specific bodily position or posture, such as an optimal lumbar curvature for alleviating increased disc pressures and providing advantageous muscle force vectors. In some embodiments, the optimal lumbar curvature is determined with reference to the pelvic incidence of the wearer. Lumbar curvature can be determined from a lumbosacral angle formed by the intersection of a line drawn from the superior surface of L1 vertebral body and a line drawn from the superior surface of the S1 vertebral body.

Assignation of the master reference minimum activation power value to the optimal lumbar curvature can be accomplished experimentally or theoretically. In some embodiments, experimental assignation comprises having the wearer assume the optimal lumbar curvature and determining the minimum activation power of the topically applied wireless strain gauge at the optimal lumbar curvature. Lateral x-rays can be used to assist in determining when the wearer has assumed the optical lumbar curvature. Moreover, in some embodiments, theoretical assignation comprises estimating the minimum activation power of the wireless strain gauge based upon deformation modeling of the nanocomposite backplane when the optimal lumbar curvature is assumed by the wearer.

Reference minimum power activation values deviating from the master reference value are subsequently assigned specific lumbar curvatures divergent from the optimal lumbar curvature associated with the master reference minimum activation power value. Assignation of the reference minimum power activation values can be accomplished empirically/experimentally or theoretically. In some embodiments, for example, the wearer assumes a variety of lumbar curvatures divergent from the optimal lumbar curvature and the minimum activation power of the topically applied wireless strain gauge is determined at each of the curvatures. Alternatively, theoretical assignation can comprise estimating the reference minimum activation power values at various lumbar curvatures based on deformation modeling of the nanocomposite backplane at the various curvatures.

With the calibration chart established, the RFID tag of the wireless strain gauge can be interrogated by a reader and the minimum activation power of the tag determined. The determined minimum activation power is subsequently compared with the reference minimum activation power values of the calibration chart and the lumbar curvature matching or substantially matching the determined minimum activation power is selected. The RFID tag of the wireless strain gauge can be routinely interrogated by the reader for continuous or periodic monitoring lumbar curvature of the wearer. The foregoing principles are also applicable to monitoring thoracic curvature and/or cervical curvature of the spine.

Further, in some embodiments, the determined minimum activation power derives a strain value for the sensed strain with reference to the change in resonant frequency of the RFID antenna. FIG. 2 illustrates change in minimum activation power of an RFID tag in response to strain sensed or applied to the nanocomposite backplane according to one embodiment described herein.

As with the minimum activation power, the derived strain can be correlated with a bodily position or posture of an individual. Correlation of the derived strain with a specific bodily position or posture of an individual, in some embodiments, is administered with a calibration chart in a manner similar to that described for minimum activation power. In some embodiments, for example, a calibration chart comprises one or more reference strain values associated with bodily position(s) or posture. A calibration chart, in some embodiments, is constructed by choosing a master reference strain value associated with a specific bodily position or posture. Reference strain values deviating from this master reference strain value indicate a different bodily position or posture has been assumed by the wearer. In some embodiments, reference strain values deviating from the master reference value are each assigned a specific bodily position or posture. Assignation of bodily position or posture to a reference strain value can be accomplished empirically/experimentally or theoretically.

With the calibration chart established, the RFID tag of the wireless strain gauge can be interrogated by a reader and the strain value of the nanocomposite backplane of the tag derived. The derived strain value is subsequently compared with the reference strain values of the calibration chart, and the bodily position or posture matching or substantially matching the derived strain value is selected. The RFID tag of the wireless strain gauge can be routinely interrogated by the reader for continuous or periodic monitoring of body position or posture of the wearer.

As an example, in some embodiments, a wireless strain gauge of an apparatus described herein is topically attached to a wearer along the lumbar curvature of the spine. A master reference strain value is assigned to a specific bodily position or posture, such as an optimal lumbar curvature for alleviating increased disc pressures and providing advantageous muscle force vectors. Assignation of the master reference strain value to the optimal lumbar curvature can be accomplished experimentally or theoretically. In some embodiments, experimental assignation comprises having the wearer assume the optimal lumbar curvature and determining the strain of the nanocomposite backplane of the topically applied wireless strain gauge at the optimal lumbar curvature. Moreover, in some embodiments, the theoretical assignation comprises estimating the strain of the wireless strain gauge based upon deformation modeling of the nanocomposite backplane when the optimal lumbar curvature is assumed by the wearer.

Reference strain values deviating from the master reference value are subsequently assigned specific lumbar curvatures divergent from the optimal lumbar curvature. Assignation of the reference strain values can be accomplished empirically/experimentally or theoretically. In some embodiments, for example, the wearer assumes a variety of lumbar curvatures divergent from the optimal lumbar curvature and the nanocomposite backplane strain of the topically applied wireless strain gauge is determined at each of the curvatures. Alternatively, theoretical assignation, in some embodiments, comprises estimating the reference strain values at various lumbar curvatures based on deformation modeling of the nanocomposite backplane at the various curvatures.

With the calibration chart established, the RFID tag of the wireless strain gauge can be interrogated by a reader and the strain value of the nanocomposite backplane derived. The derived strain value is subsequently compared with the reference strain values of the calibration chart, and the lumbar curvature matching or substantially matching the derived strain value is selected. The RFID tag of the wireless strain gauge can be routinely interrogated by the reader for continuous or periodic monitoring lumbar curvature of the wearer. The foregoing principles are also applicable to monitoring thoracic curvature and/or cervical curvature of the spine.

Calibration charts described herein, in some embodiments, are provided in electronic format for access by a processor or other computing architecture.

As described herein, apparatus for determining posture can further comprise a processor configured to receive data from the RFID tag reader. For example, the processor can receive data from the tag reader regarding the minimum activation power of one or more RFID tags on the wearer and operates on the received data to provide an output related to bodily position or posture of the wearer. In some embodiments, the processor operates on the received data in conjunction with the calibration chart to select a bodily position or posture determined by the minimum activation power and/or derived strain of one or more wireless strain gauges on the wearer. In such embodiments, the calibration chart is provided in electronic format for access by the processor.

Moreover, the processor can assist in transmitting information to the wearer detailing bodily position or posture. For example, the processor can transmit information regarding bodily position or posture to a display device and/or audio device for communication to the wearer. In some embodiments, the display and/or audio device provides an alert or indication to the wearer when posture falls outside a predetermined range. Alternatively, the display and/or audio device provides an indication to the wearer when posture is within a predetermined range. The processor can be separate from or part of the display and/or audio device. A display and/or audio device can be a cellular phone, computer or tablet electronic device.

In some embodiments, the processor is operable to assist in storage of data received from the tag reader. The processor, in some embodiments, assists in storing the received data in a long term electronic storage device or a short term electronic storage device. Additionally, an apparatus for determining posture described herein can further comprise a clock and/or global positioning system (GPS). The clock and/or GPS can be used in conjunction with bodily position or posture information provided by the processor and wireless strain gauge(s) to correlate posture of an individual with specific times and/or locations. Such information can be used to identify times and/or locations where the individual has good or bad posture. In some embodiments, the clock and/or GPS is part of the display and/or audio device such as a cellular phone, computer or electronic tablet.

IV. Methods of Determining Bodily Position or Posture

In another aspect, methods of determining bodily position or posture are described herein. In some embodiments, a method of determining posture comprises attaching at least one wireless strain gauge to a bodily location of a wearer, sensing a strain induced by movement of the wearer with the strain gauge and correlating the sensed strain with posture of the wearer, wherein the strain gauge comprises a RFID tag and a nanocomposite backplane coupled to the RFID tag.

Turning now to specific steps, a method of determining bodily position or posture described herein comprises attaching at least one wireless strain gauge to a bodily location of the wearer. In some embodiments, a plurality of wireless strain gauges is attached to a bodily location of the wearer. One or more wireless strain gauges can be attached to any desired bodily location for determination and/or monitoring of position or posture of the selected location. In some embodiments, for example, one or more wireless strain gauges are attached over or along the wearer's back for determination and/or monitoring of spinal position or posture including cervical, thoracic and/or lumbar curvatures.

Wireless strain gauges can be topically attached to the wearer with the nanocomposite backplane placed directly on the skin surface. Alternatively, in some embodiments, an adhesive can be used to attach the wireless strain gauge to the skin of the wearer.

With the one or more wireless strain gauges attached to the desired body location, a strain induced by movement of the wearer is sensed with the strain gauge. Sensing a strain induced by movement of the wearer, in some embodiments, comprises determining the minimum activation power of the RFID tag with a tag reader as described herein. The RFID tag of a wireless strain gauge, in some embodiments, is periodically or continuously interrogated by the reader to determine minimum activation power values.

The strain sensed by the wireless strain gauge is correlated to the position or posture of the wearer in the bodily location of the strain gauge. In some embodiments, correlating the sensed strain with bodily position or posture comprises comparing the determined minimum activation power with a calibration chart comprising one or more reference minimum activation power values associated with various bodily positions or postures in the location of the strain gauge and selecting the bodily position or posture matching or substantially matching the determined minimum activation power. In some embodiments, the minimum activation power determined by the reader is transmitted to a processor for comparison with the calibration chart and selection of bodily position or posture.

Further, the determined minimum activation power derives a value for the sensed strain. In such embodiments, correlating the sensed strain with the bodily position of the wearer comprises comparing the derived strain value with a calibration chart comprising one or more reference strain values associated with various bodily positions or postures in the location of the strain gauge and selecting the bodily position or posture matching or substantially matching the derived strain value.

Methods described herein further comprise providing output information to the wearer regarding the posture or bodily position. In some embodiments, such output information is provided in real time. Output information can be provided to the wearer with a display and/or audio device as described herein. Moreover, the output information, can be archived in an electronic memory or other storage device.

V. Methods of Determining Spinal Position

In a further aspect, methods of determining spinal position are described herein. A method of determining spinal position comprises attaching a plurality of wireless strain gauges along the spine of the wearer covering the cervical curvature, thoracic curvature and/or lumbar curvature, determining the existence of strain at each of the strain gauges induced by movement of the spine and correlating the sensed strain with the spinal position of wearer, wherein the wireless strain gauges comprise a RFID tag and a nanocomposite backplane coupled to the RFID tag.

In some embodiments, determining the existence of strain at each of the strain gauges comprises determining the minimum activation power of the RFID tag with a tag reader as described herein. Additionally, correlating the sensed strain with the spinal position of the wearer comprises comparing the determined minimum activation power of each strain gauge with a calibration chart comprising one or more reference minimum power activation values associated with cervical curvatures and selecting the cervical curvature matching or substantially matching the determined minimum activation power of each strain gauge. The foregoing correlation processes are repeated for the thoracic and/or lumbar curvatures to select the thoracic and lumbar curvatures matching or substantially matching the minimum activation powers of the strain gauges placed in these locations of the spine. The spinal position is subsequently constructed from the selected cervical, thoracic and/or lumbar curvatures. In some embodiments, the spinal position is constructed according to the Nyquist sampling theorem. The wireless strain gauges covering the cervical curvature, thoracic curvature and/or lumbar curvature, for example, are sampling points for reconstructing a signal modeling the spinal curvature. Increased numbers of strain gauges along the cervical curvature, thoracic curvature and/or lumbar curvature increase the sampling frequency for reconstructing the spinal curvature or posture according to the Nyquist theorem.

Minimum activation powers of the strain gauges derive values for the sensed strain. In such embodiments, correlating the sensed strain with the spinal position of the wearer comprises comparing the derived strain value of each strain gauge with a calibration chart comprising one or more reference strain values associated with cervical curvatures and selecting the cervical curvature matching or substantially matching the derived strain value of each strain gauge. The foregoing correlation processes is repeated for the thoracic and/or lumbar curvatures to select the thoracic and lumbar curvatures matching or substantially matching the derived strain values of the strain gauges placed in these locations of the spine. The spinal position is subsequently constructed from the selected cervical, thoracic and/or lumbar curvatures.

In some embodiments, the method further comprises providing output information to the wearer regarding the spinal position. In some embodiments, such output information is provided in real time. Output information can be provided to the wearer with any display and/or audio device as described herein. Moreover, the output information, can be archived in an electronic memory or other storage device.

These and other embodiments are further illustrated by the following non-limiting example.

EXAMPLE 1

Nanocomposite Backplane for Wireless Strain Gauge

A non-limiting embodiment of a nanocomposite backplane for a wireless strain gauge described herein was prepared as follows. Silver nanowires were placed in ethanol at a concentration of 3-5 mg/ml. Other solvents such as acetone or isopropyl alcohol can also be used for the silver nanowires. A microscope slide was thoroughly cleaned with ethanol and dried. A thin layer of the silver nanowire/ethanol mixture was micropipetted onto the cleaned slide and let dry.

A polydimethylsiloxane (PDMS) mixture was prepared by mixing PDMS and curing agent in a 1:10 ratio by volume. The mixture was thoroughly stirred and placed under vacuum until all bubbles were removed. The mixture was heated slightly (40-50° F.) for 5 minutes to reduce viscosity, applied over the silver nanowire layer and spin coated to control the thickness of the nanocomposite backplane. The resulting assembly was heated at 100° F. for several hours to fully cure the PDMS and complete formation of the nanocomposite backplane. The nanocomposite backplane was removed from the glass slide by peeling in preparation for application to a RFID tag. While on the slide, the nanocomposite backplane can be sized to the dimensions of the RFID tag.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A wireless strain gauge comprising:
   a radio frequency identification (RFID) tag including a tag antenna; and
   a nanocomposite backplane coupled to the RFID tag, wherein resonant frequency of the RFID tag antenna demonstrates an exponential dependence or substantially exponential dependence on strain sensed by the gauge.

2. The wireless strain gauge of claim 1, wherein the RFID tag has an operating frequency permitting communication with a tag reader over a distance of at least 1 meter.

3. The wireless strain gauge of claim 1, wherein the RFID tag is a passive tag.

4. The wireless strain gauge of claim 1, wherein the nanocomposite backplane comprises a layer of dielectric material having nanoparticles disposed therein.

5. The wireless strain gauge of claim 4, wherein the dielectric material is a polymeric material.

6. The wireless strain gauge of claim 5 wherein the polymeric material is selected from the group consisting of fluoropolymers, elastomers, polyacrylates, polystyrene and poly(vinylchloride).

7. The wireless strain gauge of claim 4, wherein the nanoparticles comprise inorganic nanoparticles, organic nanoparticles or mixtures thereof.

8. The wireless strain gauge claim 4, wherein the nanoparticles comprise carbon nanoparticles.

9. The wireless strain gauge of claim 8, wherein the carbon nanoparticles comprise fullerenes, fullerene derivatives, graphene, graphene derivatives or carbon nanotubes or mixtures thereof.

10. The wireless strain gauge of claim 4, wherein the nanoparticles are present in the dielectric material in an amount sufficient to register a strain-induced change in the relative dielectric ($\epsilon_r$) of the backplane of sufficient magnitude to establish an exponential relationship between the RFID antenna resonant frequency and strain applied to the backplane.

11. The wireless strain gauge of claim 4, wherein the nanoparticles are present in the dielectric material in an amount substantially at the percolation threshold.

12. The wireless strain gauge of claim 4, wherein the nanoparticles are present in an amount of 0.05 to 5 weight percent of the dielectric material.

13. A method of determining strain in a substrate comprising:
    providing a wireless strain gauge comprising a RFID tag and a nanocomposite backplane coupled to the RFID tag;
    coupling the strain gauge to the substrate; and
    sensing strain associated with the substrate by determining the minimum activation powder of the RFID tag, wherein the determined minimum activation power is correlated to a change in resonant frequency of the RFID antenna induced by the sensed strain.

14. The method of claim 13 further comprising comparing the determined minimum activation power with one or more reference RFID minimum activation power values to quantify the sensed strain.

15. The method of claim 14, wherein the reference minimum activation power values are derived from a calibration chart.

16. The method of claim 13, wherein the resonant frequency of the RFID antenna demonstrates an exponential dependence on the sensed strain.

17. The method of claim 13, wherein the RFID tag is interrogated by a tag reader to determine the minimum activation power.

* * * * *